US010649869B2

United States Patent
Tumuru et al.

(10) Patent No.: US 10,649,869 B2
(45) Date of Patent: May 12, 2020

(54) BURN PROCESS DATA RETRIEVAL AND NOTIFICATION

(71) Applicant: Dell Products L. P., Round Rock, TX (US)

(72) Inventors: Lokeswarareddy Tumuru, Hyderabad (IN); Radhabai Bonigam, Hyderabad (IN); Durga Prasad Bikkina, Hyderabad (IN); Muninder Raja Arram, Hyderabad (IN)

(73) Assignee: Dell Products L. P., Round Rock, TX (US)

( * ) Notice: Subject to any disclaimer, the term of this patent is extended or adjusted under 35 U.S.C. 154(b) by 201 days.

(21) Appl. No.: 15/966,153

(22) Filed: Apr. 30, 2018

(65) Prior Publication Data

US 2019/0332507 A1    Oct. 31, 2019

(51) Int. Cl.
*G06F 11/00* (2006.01)
*G06F 11/263* (2006.01)
*H04L 12/24* (2006.01)

(52) U.S. Cl.
CPC ........ *G06F 11/263* (2013.01); *H04L 41/0273* (2013.01)

(58) Field of Classification Search
CPC ....... G06F 11/26; G06F 11/263; H04L 1/0273
See application file for complete search history.

(56) References Cited

U.S. PATENT DOCUMENTS

| 5,953,688 | A  | * | 9/1999 | Su | G06F 11/273 |
| | | | | | 702/185 |
| 6,169,413 | B1 | * | 1/2001 | Paek | G11B 27/36 |
| | | | | | 324/750.07 |
| 8,990,639 | B1 | * | 3/2015 | Marr | G06F 11/30 |
| | | | | | 714/47.3 |
| 9,043,658 | B1 | * | 5/2015 | Marr | G06F 12/14 |
| | | | | | 702/182 |
| 9,507,616 | B1 | * | 11/2016 | Ramanath | G06F 11/3688 |
| 10,528,443 | B2 | * | 1/2020 | Park | G06F 11/2242 |
| 2001/0025227 | A1 | * | 9/2001 | Ajiro | G06F 11/24 |
| | | | | | 702/120 |
| 2011/0172945 | A1 | * | 7/2011 | Tian | G06F 11/24 |
| | | | | | 702/119 |
| 2015/0095892 | A1 | * | 4/2015 | Baggott | G06F 11/3612 |
| | | | | | 717/127 |
| 2016/0147545 | A1 | * | 5/2016 | Jain | G06F 9/44505 |
| | | | | | 713/100 |
| 2016/0224452 | A1 | * | 8/2016 | Park | G06F 11/2242 |

* cited by examiner

*Primary Examiner* — Joshua P Lottich
(74) *Attorney, Agent, or Firm* — Campbell Stephenson LLP; Shiv S. Naimpally (57) ABSTRACT

Disclosed herein are methods, systems, and processes for burn process data retrieval and notification. A burn process that is ongoing and that is initiated to generate burn data associated with a testing computing device is detected at a computing device. A determination is made that the burn data has been generated by the testing computing device as part of the burn process. The burn data associated with the burn process generated by the testing computing device is then retrieved.

20 Claims, 8 Drawing Sheets

BURN PROCESS DATA RETRIEVAL AND NOTIFICATION

FIELD OF THE DISCLOSURE

This disclosure is related to diagnostics and testing of computing devices. In particular, this disclosure is related to burn process data retrieval and notification.

DESCRIPTION OF THE RELATED ART

A burn process (also referred to as "burn-in" process) is a diagnostics and failure testing process by which components of a computing system (e.g., hardware components, and the like) are tested prior to being placed in service (e.g., prior to the computing system being fully assembled from those components). The burn process typically forces certain failures to occur under supervised conditions (e.g., such that load capacities of various hardware components can be understood).

The purpose of a burn process is to detect particular components that would fail as a result of the initial, high-failure rate portion of testing (e.g., based on a bathtub curve of component reliability). If the burn process is made sufficiently long and artificially stressful, the computing system being tested can then be trusted to be mostly free of further early failures once the burn process is completed. Consequently, any weak components that fail during the burn process can be replaced thus preventing premature failure, or other latent defects.

Unfortunately, currently no mechanisms exist for the proactive and real-time monitoring of a burn process and notification of the status of components being tested, particularly in storage servers. For example, an operator or an administrator has to manually check the status of the burn process and determine whether the burn process has completed. Monitoring burn processes in this manner is inefficient and resource intensive.

SUMMARY OF THE DISCLOSURE

Disclosed herein are methods, systems, and processes for proactive and real-time burn process data retrieval and notification. One such method involves detecting, at a computing device, a burn process that is ongoing and is initiated to generate burn data associated with a testing computing device, determining that the burn data has been generated by the testing computing device as part of the burn process, and retrieving the burn data associated with the burn process generated by the testing computing device.

In one embodiment, the method includes requesting the burn data from the testing computing device by transmitting a web service message with a protocol-specific mapping that includes resource identifiers associated with the burn process to the testing computing device. In this example, the web service message includes a reference associated with the testing computing device mapped to the web service message according to a transformation that is dependent on a protocol associated with the web service message and a representation of the burn data indicated by the resource identifiers included in the web service message.

In another embodiment, the burn process is initiated by an initiator computing device by accessing a unified extensible firmware interface (UEFI) of the testing computing device, and the burn process tests hardware components, firmware components, or software components installed on the testing computing device. In this example, the burn data includes failure information regarding the hardware components, the firmware components, or the hardware components installed on the testing computing device.

In certain embodiments, the retrieving of the burn data is performed using a Web Services-Management (WSMan) protocol implemented between the computing device and the testing computing device using a WSMan Application Programming Interface (API) implemented by the computing device. In this example, the burn data received from the testing computing device via the WSMan API is transmitted to a mobile computing device, and the testing computing device is a storage server.

In some embodiments, the method involves retrieving chassis information, and verifying the chassis information by comparing the chassis information with unit status information included in a burn database associated with the testing computing device. In this example, the chassis information includes an inventory list that includes identities of the hardware components, the firmware components, or software components.

In other embodiments, the WSMan API requests and retrieves the burn data from the testing computing device by converting the identities in the inventory list to the resource identifiers included in the web service message and sent to the testing computing device using the WSMan protocol.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

A burn process (also referred to as "burn-in" process) is a diagnostics and failure testing process by which components of a storage server (e.g., hardware components, and the like) are tested prior to being placed in service (e.g., prior to the storage server being fully assembled from those components). The burn process typically forces certain failures to occur under supervised conditions (e.g., such that load capacities of various hardware components of the storage server can be understood).

The purpose of a burn process is to detect particular components that would fail as a result of the initial, high-failure rate portion of testing (e.g., based on a bathtub curve of component reliability). If the burn process is made sufficiently long and artificially stressful, the computing system being tested can then be trusted to be mostly free of further early failures once the burn process is completed. Consequently, any weak components that fail during the burn process can be replaced thus preventing premature failure, or other latent defects.

Unfortunately, currently no mechanisms exist for the proactive and real-time monitoring of a burn process and notification of the status of components being tested, particularly in storage servers. For example, an operator or an administrator has to manually check the status of the burn process and determine whether the burn process has completed. Monitoring burn processes in this manner is inefficient and resource intensive.

The foregoing problem of proactively monitoring burn processes in real-time is further exacerbated when burn processes are performed on multiple electronic equipment modules such as storage servers implemented in a server rack. In such rack-mountable servers, monitoring a plethora of disparate hardware, firmware, and software components poses a particular challenge with respect to collecting and/or gathering burn data associated with burn processes executed on such servers (e.g., storage servers) because of the complexity and multiplicity of the computing architecture of such rack-based server products (e.g., unlike standalone desktop or laptop computing devices).

For example, because several storage servers can be implemented in a given rack, an operator or an administrator at a Keyboard, Video and Mouse (KVM) station has to manually plug and unplug a monitor (e.g., a display device) for each server to check the status of an ongoing or completed burn process. Moreover, the current reactive approach of checking burn process status manually and individually in a piece-meal fashion does not fully leverage the capacity of the chassis (e.g., replacing a new server when a current server finishes a burn process cannot take place until the operator or the administrator manually checks the progress of the burn process and realizes the completion of the burn process).

Disclosed herein are methods, systems, and processes for proactive and real-time burn process data monitoring, retrieval, and notification, particularly for burn processes executed on multiple disparate rack-mountable servers.

Example Burn Process Data Retrieval and Notification System

Figure 1:
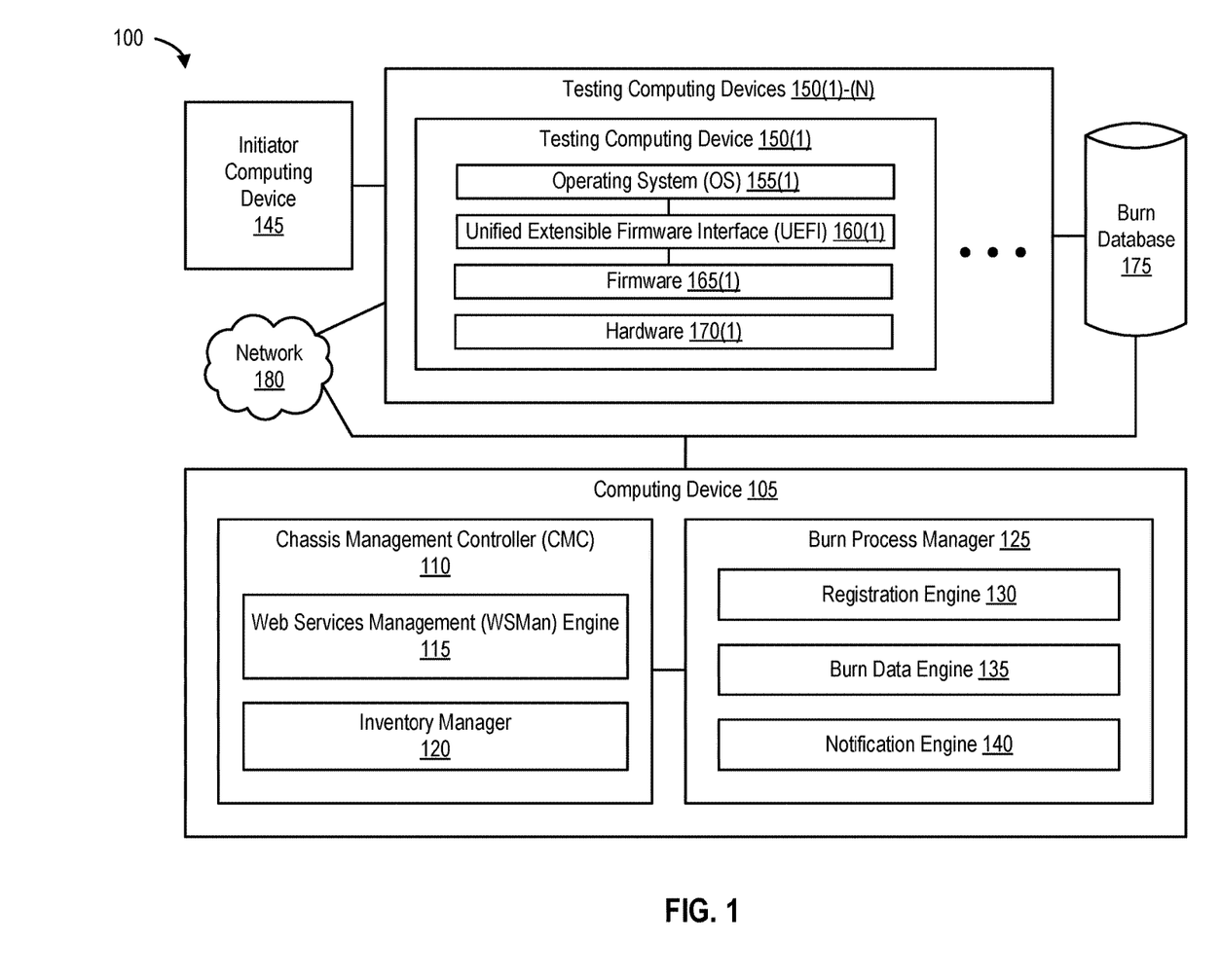
FIG. 1 is a block diagram 100 of a burn process data retrieval and notification computing environment, according to one embodiment of the present disclosure.

FIG. 1 is a block diagram 100 of a burn process data retrieval and notification computing environment, according to one embodiment. As shown in FIG. 1, computing device 105 includes at least a chassis management controller (CMC) 110. CMC 110 includes at least a Web Services Management (WSMan) engine 115 and an inventory manager 120. Computing device 105 also includes a burn process manager 125. Burn process manager 125 includes at least a registration engine 130, a burn data engine 135, and a notification engine 140.

Computing device 105 is communicatively coupled to at least one or more testing computing devices 150(1)-(N) via network 180, or any other type of interconnection. Testing computing devices 150(1)-(N) are further communicatively coupled to at least an initiator computing device 145 and include a burn database 175. Network 180 can be any type of network or interconnection (e.g., the Internet, a Wide Area Network (WAN), and the like), and computing device 105, testing computing devices 150(1)-(N), and initiator computing device 145 can each be any type of computing device (e.g., a desktop, a laptop, a mobile computing device such as a tablet or a smartphone, a server, and the like).

Testing computing device 150(1) includes at least an operating system (OS) 155(1), a Unified Extensible Firmware Interface (UEFI) 160(1), firmware 165(1), and hardware 170(1). As noted, testing computing devices 150(1)-(N) are communicatively coupled to initiator computing device 145 (e.g., either via a direct interconnection or via a network like network 180). In one embodiment, initiator computing device 145 initiates or starts one or more burn processes on one or more of testing computing devices 150(1)-(N). CMC 110, which can be implemented either in computing device 105 (as shown in FIG. 1) or on initiator computing device 145, captures burn data and stores the burn data on burn database 175.

In some embodiments, burn data is failure data associated with one or more hardware components, one or more firmware components, and/or one or more software components installed on and/or executing on testing computing devices 150(1)-(N), when one or more burn processes are executed on testing computing devices 150(1)-(N) (e.g., by initiator computing device 145). In this example, the burn data identifies hardware, software, and/or firmware components that have failed (or passed) burn testing as part of one or more burn processes.

In one embodiment, testing computing devices 150(1)-(N) are rack-mountable servers (e.g., storage servers, and the like). In this example, testing computing devices 150(1)-(N) can be accessed by CMC 110 and CMC 110 can be used to manage and administer various hardware, software, and/or firmware components that make up the chassis (e.g., rack-mounted testing computing devices 150(1)-(N)). In some embodiments, CMC 110, using inventory manager 120, captures and/or gathers chassis inventory across testing computing devices 150(1)-(N) and retrieves chassis information associated with one or more servers (e.g., storage servers), input/output (I/O) modules, media access control (MAC) addresses, and the like (e.g., using a Simple Network Management Protocol (SNMP) controller or a web services (WS) controller).

In another embodiments, CMC 110 uses the details of the chassis information captured by inventory manager 120 to retrieve unit status information (e.g., burn process status information of various components of testing computing devices 150(1)-(N) as identified by inventory manager 120), and maintain the unit status information (e.g., burn data) in burn database 175.

In certain embodiments, registration engine 130 implemented by burn process manager 125 registers one or more mobile computing devices (e.g., installed with a burn data monitoring application) based on a unique device token. Burn data engine 135 manages the retrieval and selection of burn data to be transmitted to other computing devices (e.g., for corrective action) using WSMan engine 115 (e.g., from burn database 175). Finally, notification 140 generates and transmits one or more notifications regarding burn process status (e.g., to the registered mobile computing devices).

Example Chassis Management Controller for Burn Data Management

Figure 2A:
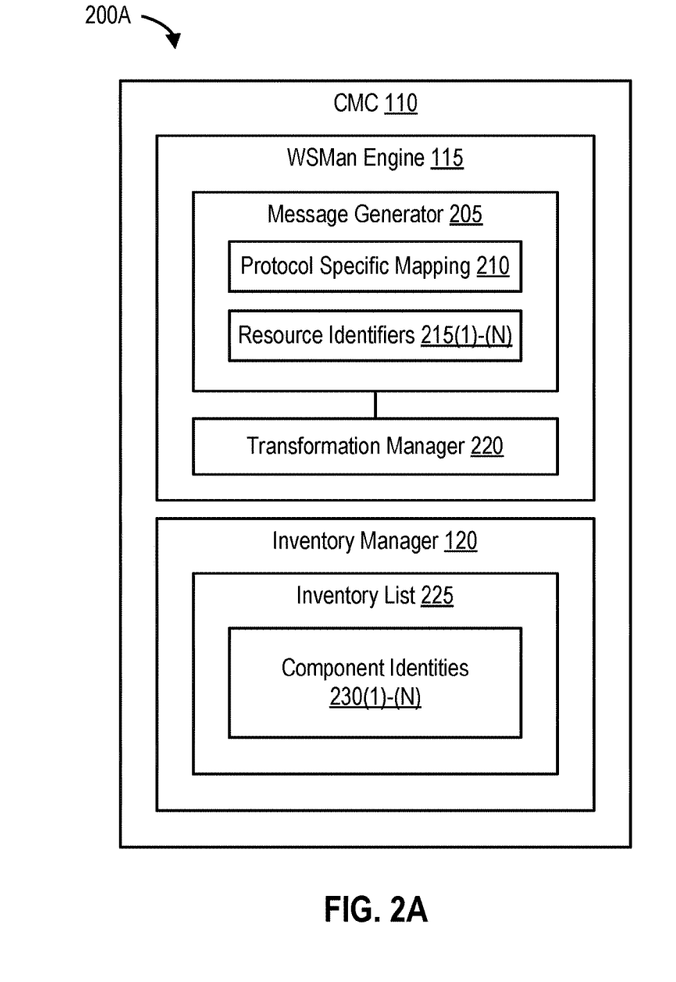
FIG. 2A is a block diagram 200A of a chassis management controller (CMC), according to one embodiment of the present disclosure.

FIG. 2A is a block diagram 200A of a chassis management controller (CMC), according to one embodiment. As shown in FIG. 2A, CMC 110 includes at least WSMan engine 115 and inventory manager 120. WSMan engine 115 implements a WSMan application programming interface (API) and includes at least a message generator 205 and a transformation manager 220. Inventory manager 120 includes at least an inventory list 225 with component identities 230(1)-(N).

In one embodiment, WSMan engine 115 detects a burn process that is ongoing and initiated (e.g., by initiator computing device 145) to generate burn data associated with one or more of testing computing devices 150(1)-(N). WSMan engine 115, in conjunction with burn data engine 135 of burn process manager 125 determines that the burn data has been generated (e.g., by one or more of testing computing devices 150(1)-(N)) as part of one or more burn processes, and retrieves the burn data associated with the burn process generated by one or more of testing computing devices 150(1)-(N).

In another embodiment, message generator 205 requests the burn data from one or more of testing computing devices 150(1)-(N) by transmitting a web service message with protocol-specific mapping 210 that includes resource identifiers (e.g., one or more of resource identifiers 215(1)-(N)) associated with the burn process to one or more of testing computing devices 150(1)-(N).

In some embodiments, the web service message generated by message generator 205 includes a reference associated with testing computing device 150(1) mapped to the web service message according to a transformation managed by transformation manager 220 that is dependent on a protocol associated with the web service message (e.g., WSMan protocol and protocol specific mapping 210) and a representation of the burn data indicated by the resource identifiers (e.g., resource identifiers 215(1)-(N)) included in the web service message). In this example, protocol specific mapping 210 defines how component identities (converted by transformation manager 220 from component identities 230(1)-(N) to resource identifiers 215(1)-(N)) are copied to message and protocol fields in the web service message generated as part of the WSMan protocol and WSMan API (e.g., WS-Transfer defines the Get, Put, Create, and Delete operations for a component of testing computing device 150(1)). In this manner, management data pertaining to burn processes and their corresponding status can be exchanged between computing device 105 and one or more testing computing devices 150(1)-(N).

In other embodiments, the WSMan API requests and retrieves the burn data from testing computing device 150(1) (e.g., from burn database 175) by converting one or more of component identities 230(1)-(N) in the inventory list to one or more of resource identifiers 215(1)-(N) included in the web service message and sent to the testing computing device using the WSMan protocol (e.g., implemented as part of message generator 205 and transformation manager 220 as noted above). For example, component identities 230(1)-(N) of one or more hardware components inventoried by inventory manager 120 of CMC 110 (e.g., using a secure browser-based interface of CMC 110) and placed in inventory list 225 can be converted (or transformed) to one or more resource identifiers 215(1)-(N) by transformation manager 220 to identify, monitor, track, and/or locate one or more components being subjected to a burn process and can be included in a web service message generated by message generator 205 and sent using the WSMan API to testing computing devices 150(1)-(N) to retrieve the specific burn data associated with those components (e.g., based on which particular testing computing device has the identified components). Because CMC 110 provides multi-chassis management, the identity of components being burn tested on multiple storage servers can be inventoried and placed in inventor list 225 as component identities 230(1)-(N) by inventor manager 125 enabling the corresponding burn data to be retrieved from burn database 175 by WSMan engine 115.

Example Burn Process Manager for Burn Data Processing

Figure 2B:
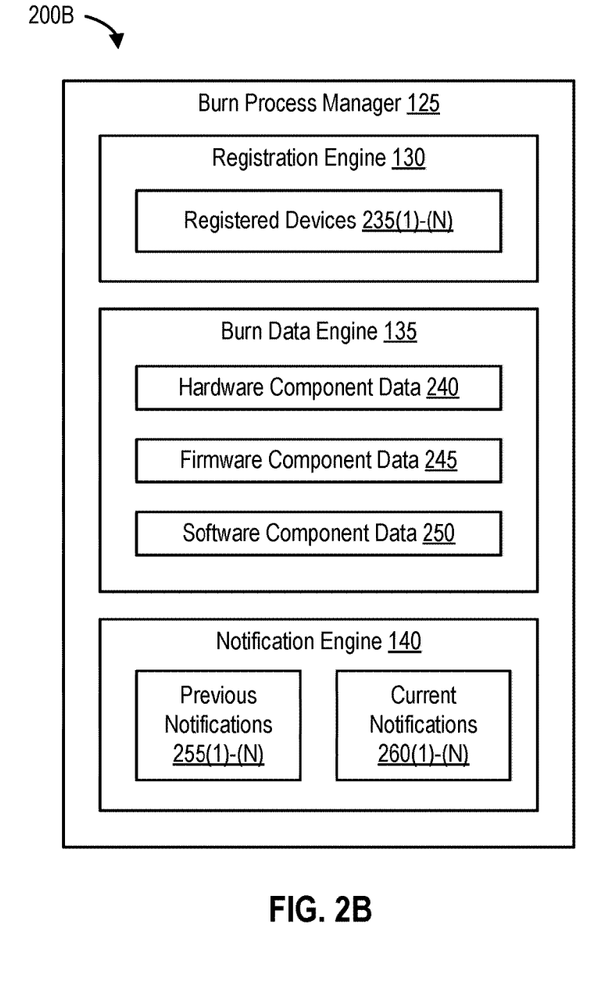
FIG. 2B is a block diagram 200B of a burn process manager, according to one embodiment of the present disclosure.

FIG. 2B is a block diagram 200B of a burn process manager, according to one embodiment. As previously noted, the retrieval of burn data is performed a Web Services-Management (WSMan) protocol implemented between computing device 105 and the testing computing device 150(1) using a WSMan Application Programming Interface (API) implemented by computing device 105. Once burn data is retrieved, the processing and notification aspects of the retrieved burn data is performed by burn process manager 125.

As previously noted, burn process manager 125 includes at least registration engine 130, burn data engine 135, and notification engine 140. Registration engine 130 includes at least registered devices 235(1)-(N). In this example, registered devices 235(1)-(N) includes the identities and contact information of one or more mobile computing devices that can be used to monitor and/or take corrective action with respect to the burn process and/or burn status of one or more testing computing devices or rack-mounted storage servers once real-time burn data has been provided to those mobile computing devices (e.g., via a mobile application).

Burn data engine 135 includes at least hardware component data 240, firmware component data 245, and software component data 250. In one embodiment, CMC 110 retrieves chassis information and burn process manager 125 verifies the chassis information by comparing the chassis information with unit status information (e.g., managed by burn data engine 135) included in burn database 175 associated with one or more testing computing devices undergoing and/or being subjected to a burn process. As noted, the chassis information includes inventory list 225 that includes component identities 230(1)-(N). When the chassis information is processed using WSMan engine 115 (as described above with respect with FIG. 2A), the result is proactive, real-time, and actionable burn data received by burn process manager 125 in the form of hardware component data 240, firmware component data 245, and/or software component data 250. In this example, and as noted, the burn data includes failure information (e.g., pass/fail information, reason for failure information, and other unit status information) regarding the hardware components, the firmware components, and/or the software components installed on one or more testing computing devices 150(1)-(N).

Notification engine 140 includes at least previous notifications 255(1)-(N) and current notifications 260(1)-(N). Notification engine 140 can transmit burn data status notifications to one or more registered computing devices (e.g., registered devices 235(1)-(N)). These status notifications can include failure data, identity of failed components, identify of components that are functioning correctly, corrective action to be taken, and other such unit status information derived from burn data engine 135. In one embodiment, burn data in the form of unit status information transmitted previously (e.g., as part of previous notifications 255(1)-(N)) is removed from current notification 260(1) by notification engine 140 to streamline the notification and corrective action process.

Therefore, burn process manager 125 at least permits the display of the unit status of storage (or other type of rack-mounted) servers under burn testing in real-time, provides enhanced storage test infrastructure utilization, and causes an improvement in storage backlog reduction. It should be noted that exposing burn data through the WSMan API does not require an agent installation.

Example Burn Process Data Retrieval and Notification

Figure 3:
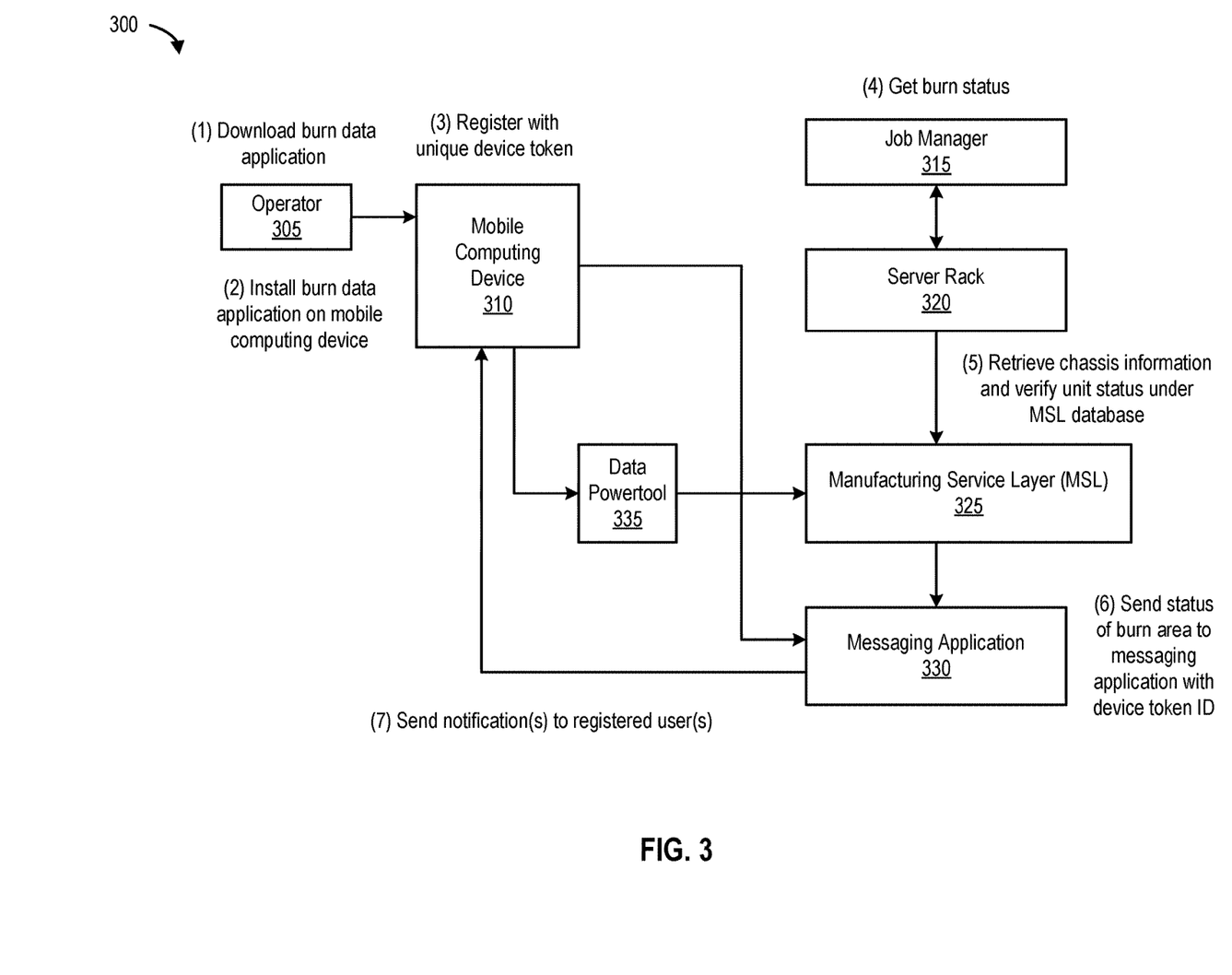
FIG. 3 is a block diagram 300 of a burn process data retrieval and notification workflow, according to one embodiment of the present disclosure.

FIG. 3 is a block diagram 300 of a burn process data retrieval and notification workflow, according to one embodiment. As shown in FIG. 3, a burn operation data retrieval and notification process involves at least seven steps. In the first step, a burn data application is downloaded by operator 305 and in the second step, the burn data application is installed on a mobile computing device (e.g., mobile computing device 310). For example, mobile computing device 310 can be registered by registration engine 130 as registered device 235(1).

Mobile computing device 310 has access to data powertool 335, which permits agent-less access to a manufacturing service layer (MSL) 325 (e.g., an interface that provides burn process or burn operation capabilities). In the fourth step, job manager 315 gets or retrieves a burn status of server rack 320 (or the burn status of one or more testing computing devices on server rack 320). In this example, the burn status captures unit status information (e.g., component failure data) associated with a current and ongoing burn operation on one or more servers of server rack 320 in real-time.

In the fifth step, chassis information is retrieved and the unit status (captured in the fourth step) is verified under a manufacturing service layer (MSL) database (e.g., burn database 175). In one embodiment, the verification is performed to ensure that only specifically requested component data in the burn data is supplied to mobile computing device 305 (e.g., burn data associated with a particular hardware component in testing computing device 150(2)). In the sixth step, the status of the burn area is sent to a messaging application with a device ID token (e.g., identifying mobile computing device 305). In the seventh and final step, notifications are sent to registered users (e.g., by notification engine 140).

Therefore, the burn process data retrieval and notification workflow of FIG. 3 at least provides an intelligent information system for storage test operations that integrates hardware logs of a physical build unit with corresponding sales order attributes as well as providing burn metrics to business and information technology professionals.

Example Storage Notification System

Figure 4:
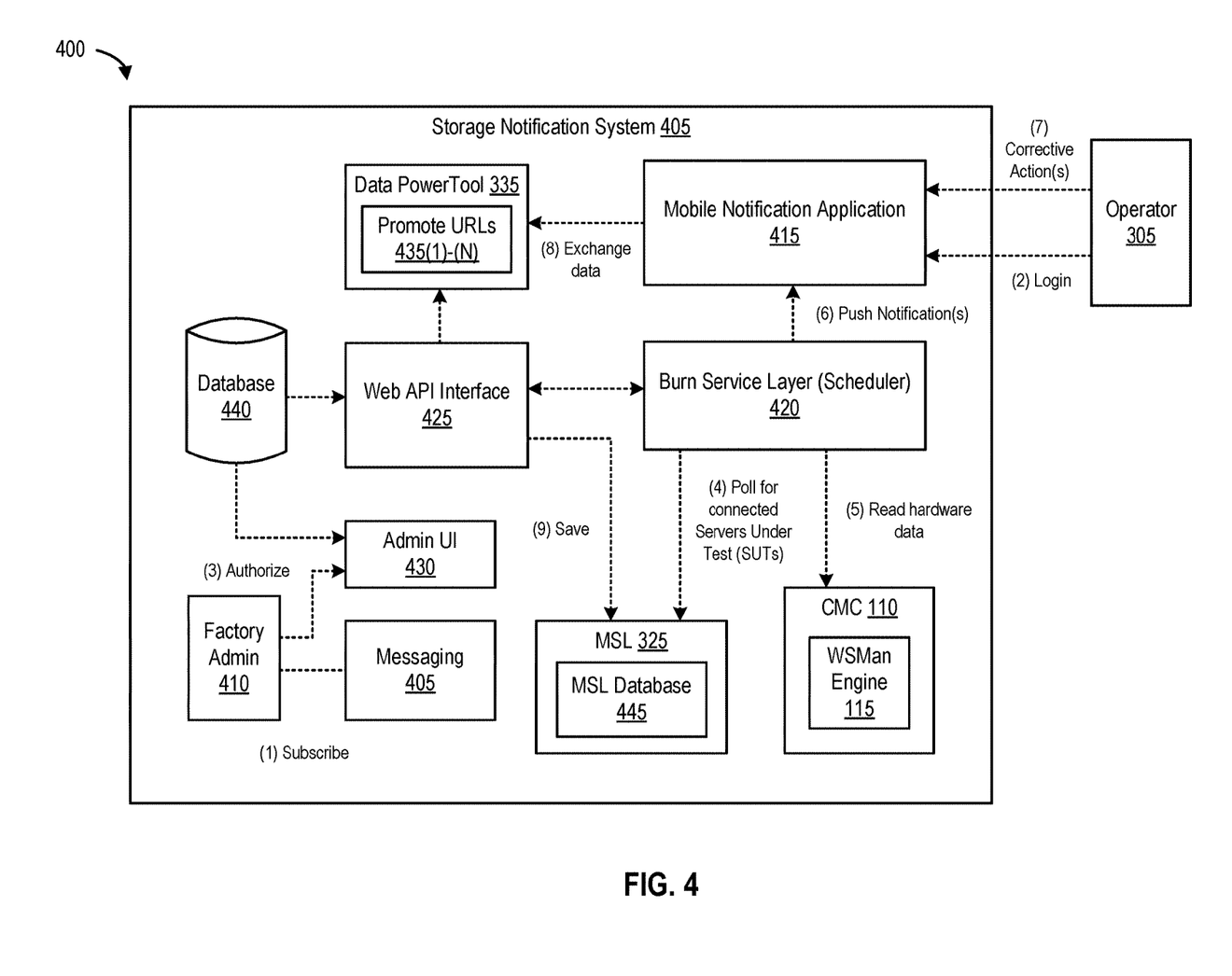
FIG. 4 is a block diagram 400 of a storage notification system, according to one embodiment of the present disclosure.

FIG. 4 is a block diagram 400 of a storage notification system, according to one embodiment. As shown in FIG. 4, storage notification system 405 includes at least CMC 110 (with WSMan engine 115), MSL 325 (with a MSL database 445), messaging 405 (e.g., a cross-platform cloud messaging application) a factor administrator 410, a database 440, an administrator user interface (UI) 430, a web API interface 425, data powertool 335 (with promote URLs 435(1)-(N)) (e.g., for agent-less access of testing computing devices), a mobile notification application 415, a burn service layer (scheduler) 420, and an operator 305.

The factory administrator 410 subscribes (e.g., to storage notification system 405) using administrator UI 430. Next, operator 305 logs in (to storage notification system 405) using mobile notification application 415, and the factory administrator 410 and operator 305 are authorized via administrator UI 430 (by verifying with database 440). The burn service layer 420 then polls MSL 325 and MSL database 445 for connected servers under test (SUTs) (e.g., to identify testing computing devices that are undergoing burn testing).

Next, burn service layer 420 reads hardware data from CMC 110 (e.g., using the WSMan protocol implemented via the WSMan API), and pushes notifications to mobile notification application 415. Operator 305 takes corrective action and mobile notification application 415 exchanges burn data with data powertool 335. The burn data included as part of the notification(s) as well as the corrective action(s) taken are finally saved in MSL database 445 with the use of web API interface 425.

Therefore, storage notification system 405 at least exposes burn data through WSMan APIs, which does not require an agent installation. Further, a mobile application is leveraged for proactive notification on burn rack status.

Example Processes for Burn Process Data Retrieval and Notification

Figure 5:
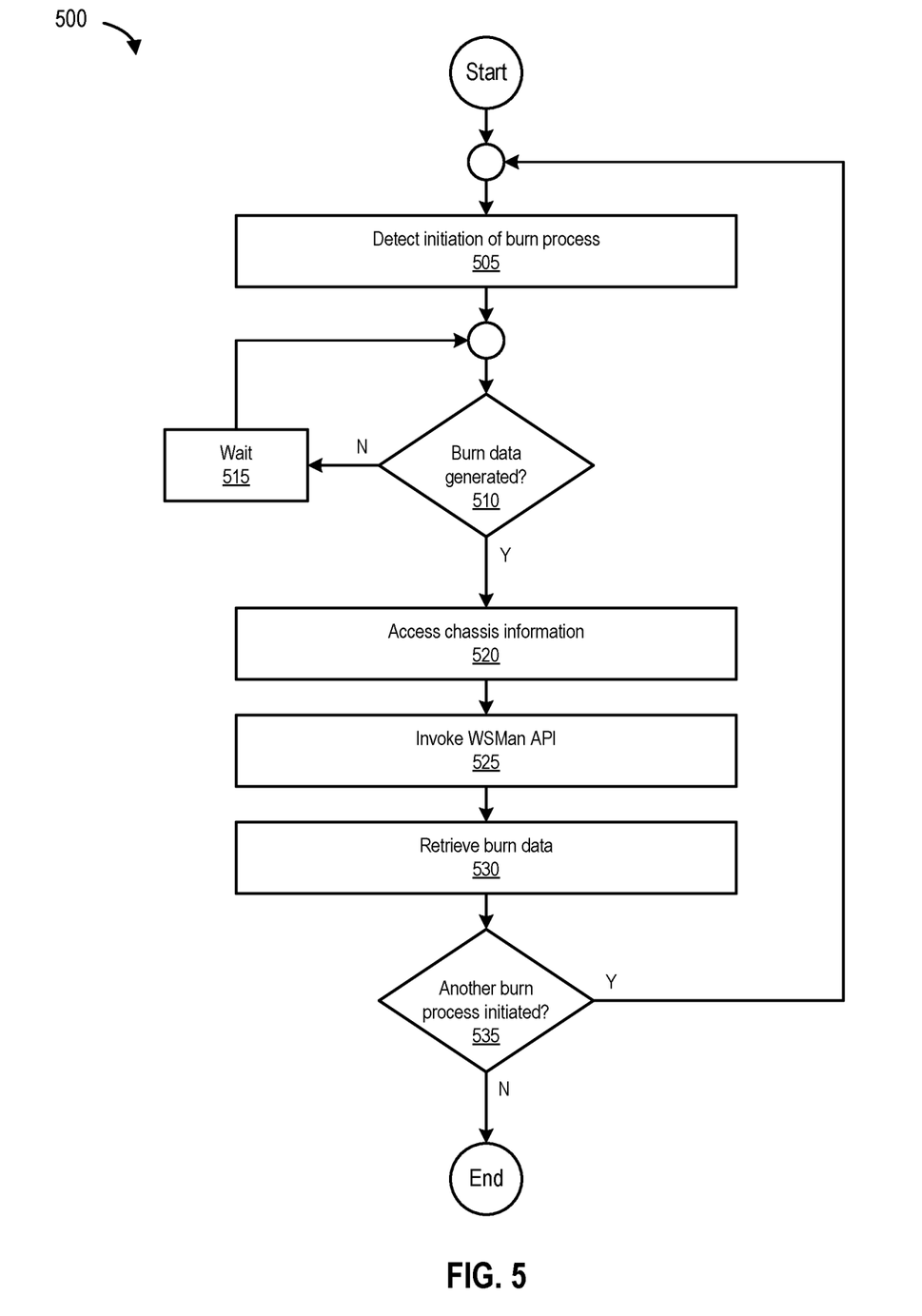
FIG. 5 is a flowchart 500 of a process for burn data retrieval, according to one embodiment of the present disclosure.

FIG. 5 is a flowchart 500 of a process for burn data retrieval, according to one embodiment. The process begins at 505 by detecting initiation of a burn process (e.g., initiated by initiator computing device 145). At 510, the process determines if burn data is generated (e.g., by CMC 110). If burn data has not been generated, the process waits. However, if burn data has been generated, the process, at 520, accesses chassis information (e.g., chassis information regarding component identities 230(1)-(N) of one or more of testing computing devices 150(1)-(N) and/or rack-mounted (storage) servers collected and inventoried by CMC 110 as part of inventory list 225 as shown in FIG. 2A).

At 525, the process invokes the WSMan API (e.g., using WSMan engine 115 for agent-less burn data collection and retrieval). At 530, the process retrieves burn data (e.g., hardware component data 240, firmware component data 245, and/or software component data 250 by generating a message (e.g., a web service message) using message generator 205 with protocol specific mapping 220 and resource identifiers 215(1)-(N) converted/created from component identities 230(1)-(N) by transformation manager 220). At 535, the process determines if another burn process is initiated. If another burn process is initiated, the process loops to 505. Otherwise, the process ends.

Figure 6:
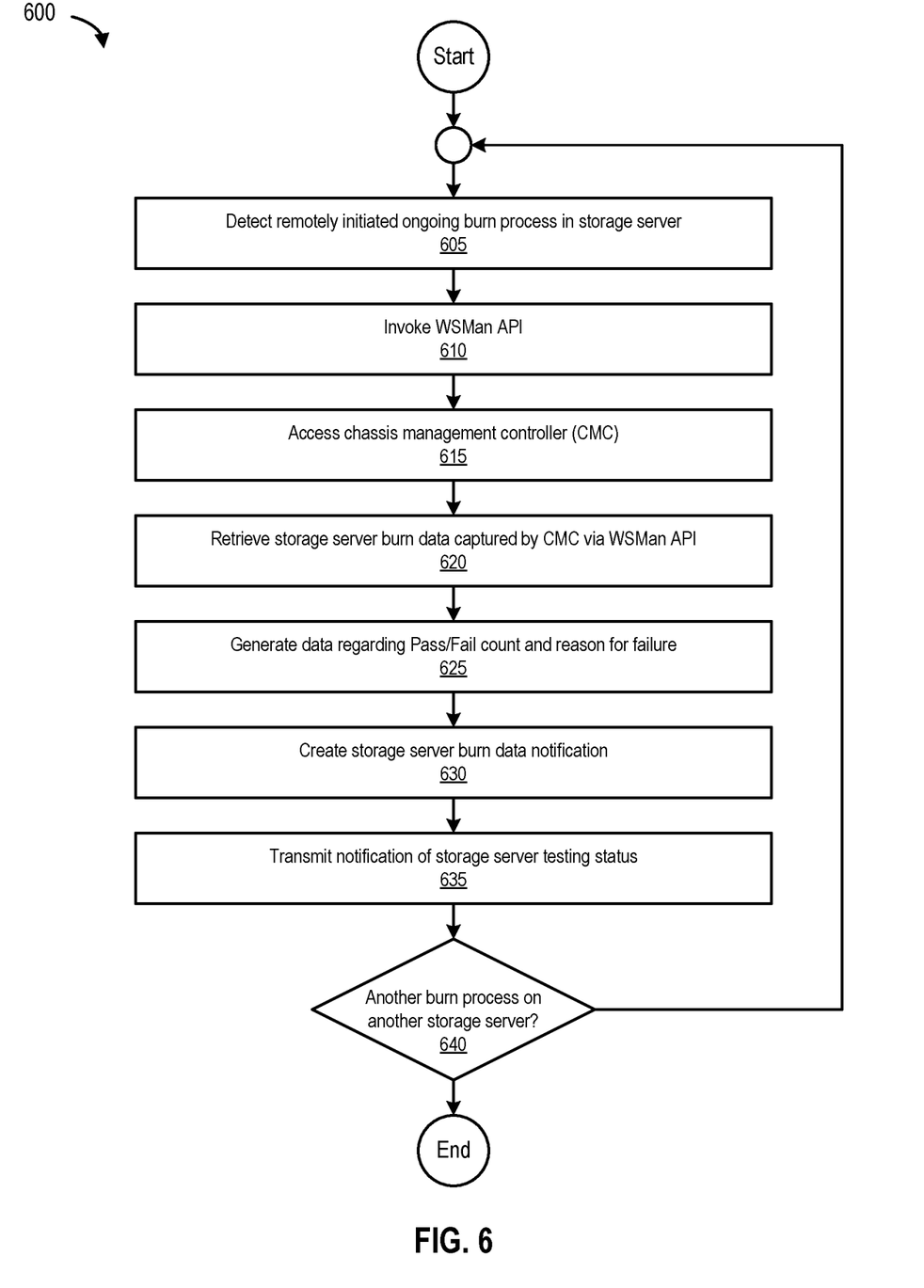
FIG. 6 is a flowchart 600 of a process for burn process notification, according to one embodiment of the present disclosure.

FIG. 6 is a flowchart 600 of a process for burn process notification, according to one embodiment. The process begins at 605 by detecting a remotely initiated ongoing burn process in a storage server (e.g., testing computing device 150(1)). At 610, the process invokes the WSMan API (e.g., provided by WSMan engine 115 as shown in FIGS. 1 and 2A), and at 615, accesses a chassis management controller (e.g., CMC 110). In this example, a chassis management controller like CMC 110 is a systems management component implemented in computing device 105 designed to manage one or more modular server infrastructures that include multiple disparate servers (e.g., storage servers, database servers, web servers, and the like).

At 620, the process retrieves storage server burn data captured by the CMC via the WSMan API, and at 625, generates data regarding pass/fail count and reason for failure (e.g., of one or more components of one or more storage servers undergoing or subjected to the burn process). At 630, the process a storage server burn data notification (e.g., using notification engine 140) and at 635, transmits notification of the storage server testing status (e.g., to one or more registered mobile applications, and the like). At 640, the process determines if another burn process on another storage sever has been initiated. If another burn process on another storage server has been initiated, the process loops to 605. Otherwise, the process ends.

Therefore, the methods, systems, and processes disclosed herein provide proactive and real-time burn process data monitoring, retrieval, and notification for burn processes executed on multiple disparate rack-mountable computing devices.

Example Computing Environment

Figure 7:
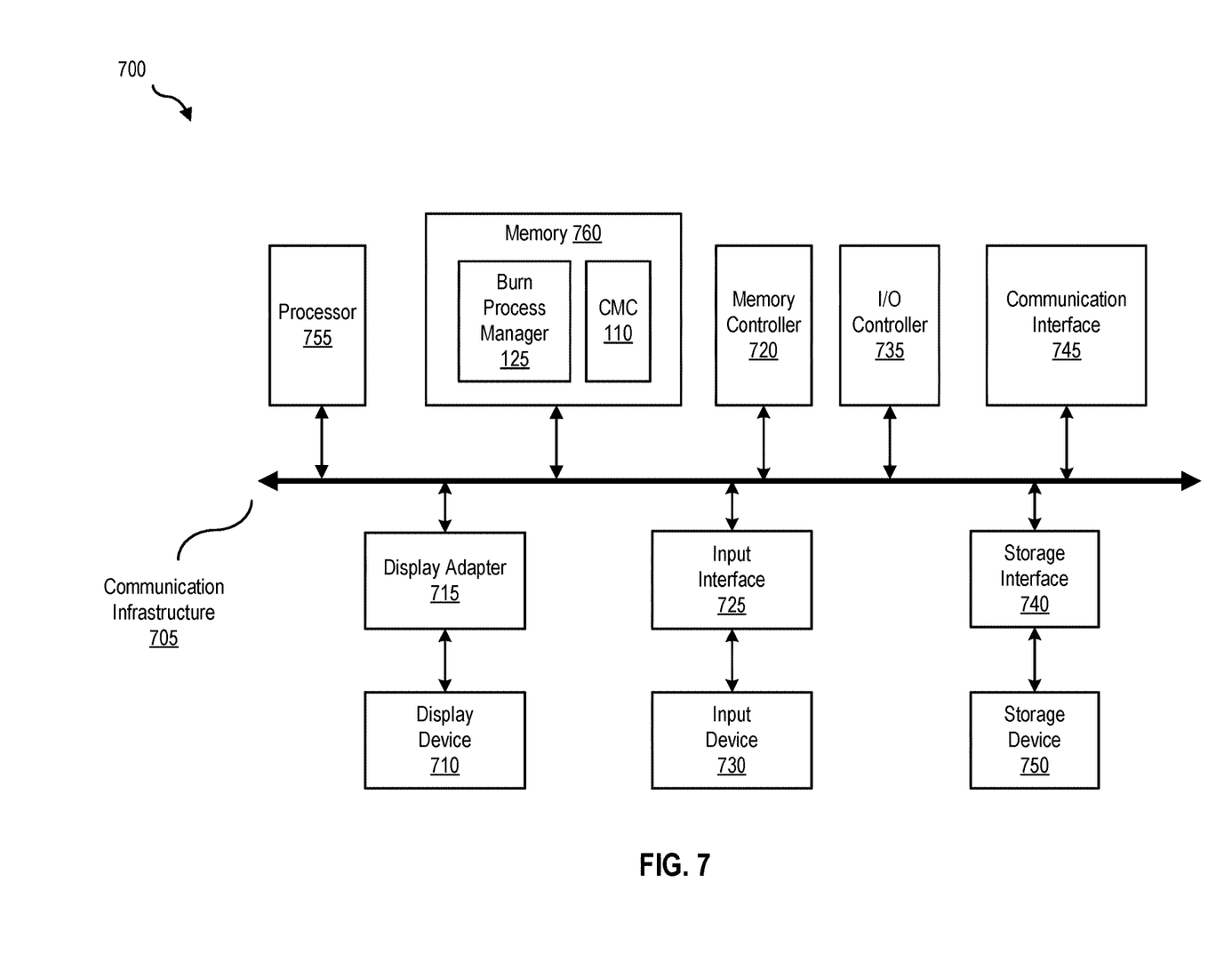
FIG. 7 is a block diagram 700 of a computing system, according to one embodiment of the present disclosure.

FIG. 7 is a block diagram 700 of a computing system, according to one embodiment. FIG. 7 illustrates how CMC 110 and/or burn process manager 125 can be implemented in software, according to one embodiment. Computing system 700 can include computing device 105 and broadly represents any single or multi-processor computing device or system capable of executing computer-readable instructions. Examples of computing system 700 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 700 may include at least one processor 755 and a memory 760. By executing the software that executes CMC 110 and/or burn process manager 125, computing system 700 becomes a special purpose computing device that is configured to perform burn process data retrieval and notification.

Processor 755 generally represents any type or form of processing unit capable of processing data or interpreting and executing instructions. In certain embodiments, processor 755 may receive instructions from a software application or module. These instructions may cause processor 755 to perform the functions of one or more of the embodiments described and/or illustrated herein. For example, processor 755 may perform and/or be a means for performing all or some of the operations described herein. Processor 755 may also perform and/or be a means for performing any other operations, methods, or processes described and/or illustrated herein. Memory 760 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 700 may include both a volatile memory unit and a non-volatile storage device. In one example, program instructions implementing CMC 110 and/or burn process manager 125 may be loaded into memory 760.

In certain embodiments, computing system 700 may also include one or more components or elements in addition to processor 755 and/or memory 760. For example, as illustrated in FIG. 7, computing system 700 may include a memory controller 720, an Input/Output (I/O) controller 735, and a communication interface 745, each of which may be interconnected via a communication infrastructure 705. Communication infrastructure 705 generally represents any type or form of infrastructure capable of facilitating communication between one or more components of a computing device. Examples of communication infrastructure 705 include, without limitation, a communication bus (such as an Industry Standard Architecture (ISA), Peripheral Component Interconnect (PCI), PCI express (PCIe), or similar bus) and a network.

Memory controller 720 generally represents any type/form of device capable of handling memory or data or controlling communication between one or more components of computing system 700. In certain embodiments memory controller 720 may control communication between processor 755, memory 760, and I/O controller 735 via communication infrastructure 705. In certain embodiments, memory controller 720 may perform and/or be a means for performing, either alone or in combination with other elements, one or more of the operations or features described and/or illustrated herein.

I/O controller 735 generally represents any type or form of module capable of coordinating and/or controlling the input and output functions of an appliance and/or a computing device. For example, in certain embodiments I/O controller 735 may control or facilitate transfer of data between one or more elements of computing system 700, such as processor 755, memory 760, communication interface 745, display adapter 715, input interface 725, and storage interface 740.

Communication interface 745 broadly represents any type or form of communication device or adapter capable of facilitating communication between computing system 700 and one or more other devices. Communication interface 745 may facilitate communication between computing system 700 and a private or public network including additional computing systems. Examples of communication interface 745 include, without limitation, a wired network interface (such as a network interface card), a wireless network interface (such as a wireless network interface card), a modem, and any other suitable interface. Communication interface 745 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 745 may also represent a host adapter configured to facilitate communication between computing system 700 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 745 may also allow computing system 700 to engage in distributed or remote computing (e.g., by receiving/sending instructions to/from a remote device for execution).

As illustrated in FIG. 7, computing system 700 may also include at least one display device 710 coupled to communication infrastructure 705 via a display adapter 715. Display device 710 generally represents any type or form of device capable of visually displaying information forwarded by display adapter 715. Similarly, display adapter 715 generally represents any type or form of device configured to forward graphics, text, and other data from communication infrastructure 705 (or from a frame buffer, as known in the art) for display on display device 710. Computing system 700 may also include at least one input device 730 coupled to communication infrastructure 705 via an input interface 725. Input device 730 generally represents any type or form of input device capable of providing input, either computer or human generated, to computing system 700. Examples of input device 730 include a keyboard, a pointing device, a speech recognition device, or any other input device.

Computing system 700 may also include storage device 750 coupled to communication infrastructure 705 via a storage interface 740. Storage device 750 generally represents any type or form of storage devices or mediums capable of storing data and/or other computer-readable instructions. For example, storage device 750 may include a magnetic disk drive (e.g., a so-called hard drive), a floppy disk drive, a magnetic tape drive, an optical disk drive, a flash drive, or the like. Storage interface 740 generally represents any type or form of interface or device for transferring and/or transmitting data between storage device 750, and other components of computing system 700. Storage device 750 may be configured to read from and/or write to a removable storage unit configured to store computer software, data, or other computer-readable information. Examples of suitable removable storage units include a floppy disk, a magnetic tape, an optical disk, a flash memory device, or the like. Storage device 750 may also include other similar structures or devices for allowing computer software, data, or other computer-readable instructions to be loaded into computing system 700. For example, storage device 750 may be configured to read and write software, data, or other computer-readable information. Storage device 750 may also be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from that shown in FIG. 7. Computing system 700 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 700 for storage in memory via a network such as the Internet or upon a carrier medium.

The computer-readable medium containing the computer program may be loaded into computing system 700. All or a portion of the computer program stored on the computer-readable medium may then be stored in memory 760 and/or various portions of storage device 750. When executed by processor 755, a computer program loaded into computing system 700 may cause processor 755 to perform and/or be a means for performing the functions of one or more of the embodiments described/illustrated herein. Additionally or alternatively, one or more of the embodiments described and/or illustrated herein may be implemented in firmware and/or hardware. For example, computing system 700 may be configured as an application specific integrated circuit (ASIC) adapted to implement one or more of the embodiments disclosed herein.

Example Networking Environment

Figure 8:
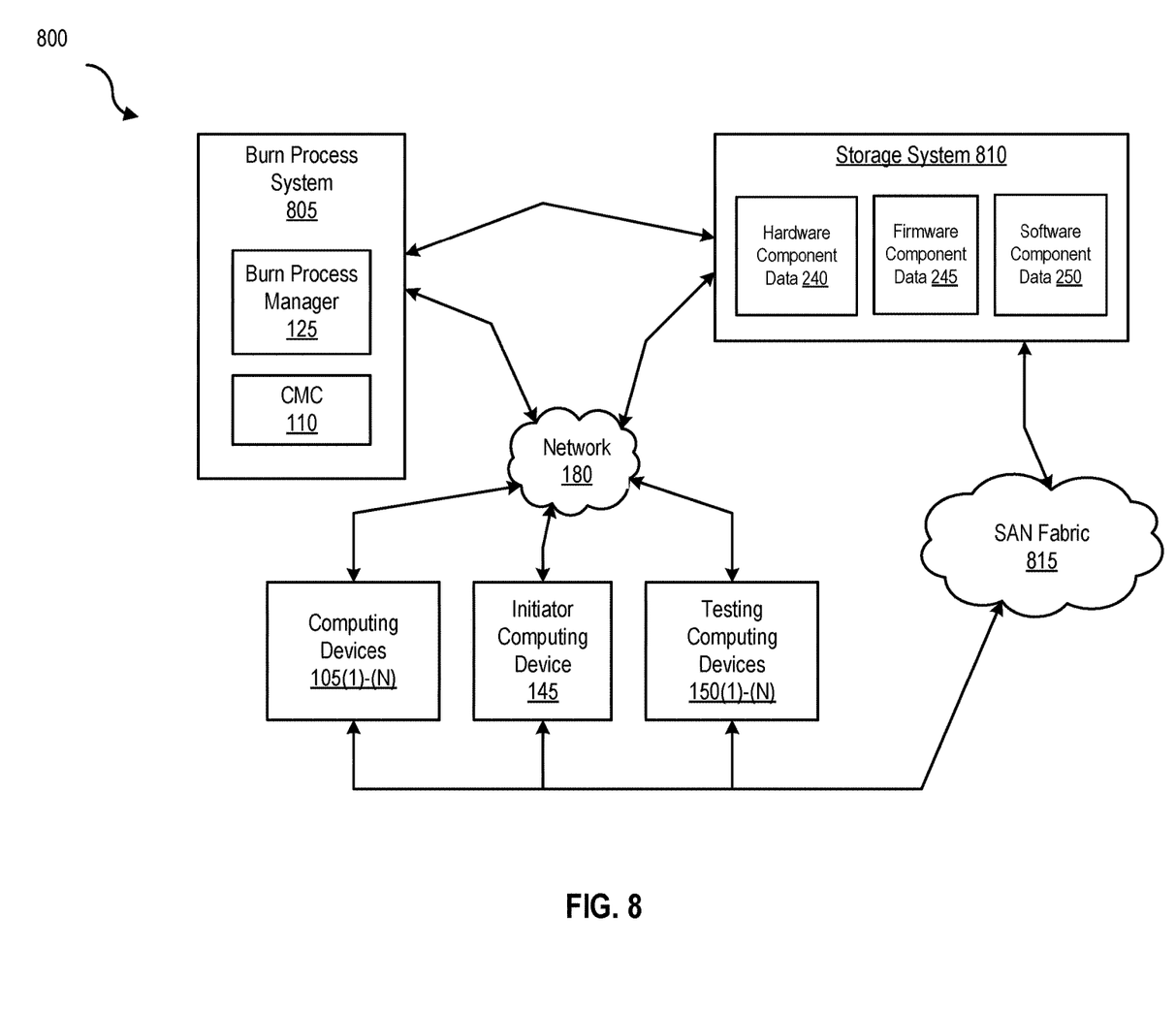
FIG. 8 is a block diagram 800 of a networked system, according to one embodiment of the present disclosure.

FIG. 8 is a block diagram of a networked system, illustrating how various computing devices can communicate via a network, according to one embodiment. In certain embodiments, network-attached storage (NAS) devices may be configured to communicate with computing device 105 and testing computing devices 150(1)-(N) using Network File System (NFS), Server Message Block (SMB), or Common Internet File System (CIFS). Network 180 generally represents any type or form of computer network or architecture capable of facilitating communication between computing device 105 and testing devices 150(1)-(N).

In certain embodiments, a communication interface, such as communication interface 745 in FIG. 7, may be used to provide connectivity between computing device 105 and testing devices 150(1)-(N), and network 180. The embodiments described and/or illustrated herein are not limited to the Internet or any particular network-based environment.

In some embodiments, network 180 can be a Storage Area Network (SAN). In other embodiments, CMC 110 and/or burn process manager 125 may be part of computing device 105, or may be separate. If separate, CMC 110, burn process manager 125, and computing device 105 may be communicatively coupled via network 180.

In one embodiment, all or a portion of one or more of the disclosed embodiments may be encoded as a computer program and loaded onto and executed by computing device 105 and/or burn process system 805, or any combination thereof. All or a portion of one or more of the embodiments disclosed herein may also be encoded as a computer program, stored on computing device 105 and/or burn process system 805, and distributed over network 180.

In some examples, all or a portion of computing device 105, and/or burn process system 805 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, CMC 110 and/or burn process manager 125 may transform the behavior of computing device 105 and/or burn process system 805 in order to cause computing device 105 and/or burn process system 805 to perform burn process data retrieval and notification.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
    detecting, at a computing device, a burn process that is ongoing and is initiated to generate burn data associated with a testing computing device;
    determining that the burn data has been generated by the testing computing device as part of the burn process;
    retrieving the burn data associated with the burn process generated by the testing computing device; and
    transmitting, to the testing computing device, a web service message with a protocol-specific mapping comprising one or more resource identifiers associated with the burn process, wherein the web service message requests the burn data from the testing computing device.

2. The computer-implemented method of claim 1, wherein
    the burn process is initiated by an initiator computing device by accessing a unified extensible firmware interface (UEFI) of the testing computing device, and
    the burn process tests one or more hardware components, one or more firmware components, or one or more software components installed on the testing computing device.

3. The computer-implemented method of claim 2, wherein
    the burn data comprises failure information regarding the one or more hardware components, the one or more firmware components, or the one or more hardware software components installed on the testing computing device.

4. The computer-implemented method of claim 3, wherein
    the web service message comprises a reference associated with the testing computing device mapped to the web service message according to a transformation that is dependent on a protocol associated with the web service message and a representation of the burn data indicated by the one or more resource identifiers comprised in the web service message.

5. The computer-implemented method of claim 1, wherein
    the retrieving is performed using a Web Services-Management (WSMan) protocol, and
    the WSMan protocol is implemented between the computing device and the testing computing device using a WSMan Application Programming Interface (API) implemented by the computing device.

6. The computer-implemented method of claim 5, further comprising:
    transmitting the burn data received from the testing computing device via the WSMan API to a mobile computing device, wherein
        the testing computing device is a storage server.

7. The computer-implemented method of claim 6, further comprising:
    retrieving chassis information; and
    verifying the chassis information by comparing the chassis information with unit status information comprised in a burn database associated with the testing computing device.

8. The computer-implemented method of claim 7, wherein
    the chassis information comprises an inventory list comprising one or more identities of the one or more hardware components, the one or more firmware components, or the one or more software components.

9. The computer-implemented method of claim 8, wherein
    the WSMan API requests and retrieves the burn data from the testing computing device by converting the one or more identities in the inventory list to the one or more resource identifiers comprised in the web service message and sent to the testing computing device using the WSMan protocol.

10. A non-transitory computer readable storage medium comprising program instructions executable to:
    detect, at a computing device, a burn process that is ongoing and is initiated to generate burn data associated with a testing computing device;
    determine that the burn data has been generated by the testing computing device as part of the burn process;
    retrieve the burn data associated with the burn process generated by the testing computing device; and
    transmit, to the testing computing device, a web service message with a protocol-specific mapping comprising one or more resource identifiers associated with the burn process, wherein the web service message requests the burn data from the testing computing device.

11. The non-transitory computer readable storage medium of claim 10, wherein:
    the burn process is initiated by an initiator computing device by accessing a unified extensible firmware interface (UEFI) of the testing computing device; and
    the burn process tests one or more hardware components, one or more firmware components, or one or more software components installed on the testing computing device.

12. The non-transitory computer readable storage medium of claim 11, wherein:
    the burn data comprises failure information regarding the one or more hardware components, the one or more firmware components, or the one or more hardware components installed on the testing computing device,
    the web service message comprises a reference associated with the testing computing device mapped to the web service message according to a transformation that is dependent on a protocol associated with the web service message and a representation of the burn data indicated by the one or more resource identifiers comprised in the web service message, and
    the retrieving is performed using a Web Services-Management (WSMan) protocol implemented between the computing device and the testing computing device using a WSMan Application Programming Interface (API) implemented by the computing device.

13. The non-transitory computer readable storage medium of claim 12, further comprising:
    transmitting the burn data received from the testing computing device via the WSMan API to a mobile computing device, wherein the testing computing device comprises a storage server;
    retrieving chassis information; and
    verifying the chassis information by comparing the chassis information with unit status information comprised in a burn database associated with the testing computing device.

14. The non-transitory computer readable storage medium of claim 13, wherein the chassis information comprises an inventory list comprising one or more identities of the one or more hardware components, the one or more firmware components, or the one or more software components, and the WSMan API requests and retrieves the burn data from the testing computing device by converting the one or more identities in the inventory list to the one or more resource identifiers comprised in the web service message and sent to the testing computing device using the WSMan protocol.

15. A computing device comprising:

one or more processors; and a memory coupled to the one or more processors, wherein the memory stores program instructions executable by the one or more processors to:

detect a burn process that is ongoing and is initiated to generate burn data associated with a testing computing device;

determine that the burn data has been generated by the testing computing device as part of the burn process;

retrieve the burn data associated with the burn process generated by the testing computing device; and     transmit, to the testing computing device, a web service message with a protocol-specific mapping comprising one or more resource identifiers associated with the burn process, wherein the web service message requests the burn data from the testing computing device.

16. The computing device of claim 15, wherein:

the burn process is initiated by an initiator computing device by accessing a unified extensible firmware interface (UEFI) of the testing computing device; and the burn process tests one or more hardware components, one or more firmware components, or one or more software components installed on the testing computing device.

17. The computing device of claim 16, wherein:

the burn data comprises failure information regarding the one or more hardware components, the one or more firmware components, or the one or more hardware components installed on the testing computing device, the web service message comprises a reference associated with the testing computing device mapped to the web service message according to a transformation that is dependent on a protocol associated with the web service message and a representation of the burn data indicated by the one or more resource identifiers comprised in the web service message, and the retrieving is performed using a Web Services-Management (WSMan) protocol implemented between the computing device and the testing computing device using a WSMan Application Programming Interface (API) implemented by the computing device.

18. The computing device of claim 17, further comprising:

transmitting the burn data received from the testing computing device via the WSMan API to a mobile computing device, wherein the testing computing device comprises a storage server;

retrieving chassis information; and verifying the chassis information by comparing the chassis information with unit status information comprised in a burn database associated with the testing computing device.

19. The computing device of claim 18, wherein:

the chassis information comprises an inventory list comprising one or more identities of the one or more hardware components, the one or more firmware components, or the one or more software components.

20. The computing device of claim 19, wherein:

the WSMan API requests and retrieves the burn data from the testing computing device by converting the one or more identities in the inventory list to the one or more resource identifiers comprised in the web service message and sent to the testing computing device using the WSMan protocol.

\* \* \* \* \*